United States Patent [19]
Narita et al.

[11] Patent Number: 5,967,547
[45] Date of Patent: Oct. 19, 1999

[54] AIR BAG SYSTEM FOR VEHICLE SEAT

[75] Inventors: Masanori Narita; Yasuki Matsuura, both of Kanagawa-ken, Japan

[73] Assignee: Nissan Motor Co., Ltd., Kanagawa-ken, Japan

[21] Appl. No.: 08/980,234

[22] Filed: Nov. 28, 1997

[30]   Foreign Application Priority Data

Nov. 29, 1996  [JP]  Japan .................................. 8-320098

[51] Int. Cl.⁶ ................................................. B60R 21/22
[52] U.S. Cl. ..................................... 280/730.2; 280/728.2
[58] Field of Search .......................... 280/728.1, 728.2, 280/730.1, 730.2, 732

[56]          References Cited
          U.S. PATENT DOCUMENTS

| | | | |
|---|---|---|---|
| 5,499,840 | 3/1996 | Nakano | 280/730.2 |
| 5,556,127 | 9/1996 | Hurford et al. | 280/730.2 |
| 5,651,582 | 7/1997 | Nakano | 280/730.2 |
| 5,667,242 | 9/1997 | Slack et al. | 280/730.2 |
| 5,735,542 | 4/1998 | Bohn | 280/728.2 |

FOREIGN PATENT DOCUMENTS 4-50052  2/1992  Japan .

*Primary Examiner*—Eric D. Culbreth
*Attorney, Agent, or Firm*—McDermott, Will & Emery

[57]          ABSTRACT

In order to reinforce the opening of an air bag container against excessive deformation, laterally extending ribs of beads are formed on the upper and lower surfaces of the container. Vertically extending connection flanges which are arranged on the inboard edges of the container are arranged to be merged and/or rigidly connected with the ribs. Openings in the flanges through which bolts are disposed are arranged proximate the ribs.

11 Claims, 6 Drawing Sheets

AIR BAG SYSTEM FOR VEHICLE SEAT

The content of Application No. TOKUGANHEI 8-320098 which was filed in Japan on Nov. 29, 1996 and on which the claim to priority for this application is based, is hereby incorporated by reference.

BACKGROUND OF THE INVENTION

1. Field of the Invention

The present invention relates to an air bag system for a vehicle seat and, more particularly, to an air bag system for a vehicle seat capable of absorbing a side impact force applied to a passenger by a side panel of a vehicle body in a manner which protects the passenger from the side impact load, by deploying an air bag stowed in one side portion of a seat back, when a vehicle is involved in a side collision.

2. Description of the Related Art

In order to avoid direct impact between the side panels of a vehicle body, such as a door panel or plate, which are deformed by the impact load and a passenger seated on the seat when the vehicle is subjected to a side impact, various air bag systems have been proposed. Patent Application Publication (KOKAI) 4-50052, discloses on such example.

In a common configuration of this kind of the air bag system, an inflator and an air bag are installed together in a metal case. The air bag system is fitted to a side bracket which is secured to an outboard side of a seat back frame. When a collision occurs, high pressure gas is immediately generated by the inflator and injected into the air bag. This rapidly inflates the air bag which rapidly spreads out in the forward direction of the vehicle from an opening in the metal case. At that time, the air bag breaks through a stitching portion of the seat back cover and rapidly deploys into the passenger compartment. The direction in which the air bag spreads can be regulated by the opening portion of the metal case.

SUMMARY OF THE INVENTION

However, in the air bag system in the prior art, there have been some cases where, when an expanding force of the air bag is applied to the metal case, the outer side surface portion of the metal case, which is not secured to the seat back frame, is deformed in the lateral direction of the vehicle whereby the opening portion of the metal case becomes excessively distorted.

In order to prevent such an excessive distortion of the opening portion, it has been proposed to increase the rigidity of the metal case by increasing the thickness of the plate from which it is formed. However, this suffers from the drawback that the weight of the metal case is increased and thus contributes to the an overall increase in the weight of the vehicle.

Therefore, it is an object of the present invention to provide the air bag system for the vehicle seat which is capable of attenuating excessive distortion of the opening portion of the metal case without an attendant increase in the weight thereof.

In order to achieve the above object of the present invention, there is provided an air bag system for a vehicle seat comprising a metal case which is fitted to a side bracket of a seat back frame, and which has a longitudinal shape wherein the height taken in the vertical direction is larger than the width in the lateral direction of the vehicle. This case has an opening directed to a front side of a vehicle and includes an inflator arranged in the metal case along with an air bag which is arranged to spread out and deploy when gas generated from the inflator is injected. In this arrangement the metal case includes an upper surface portion, a lower surface portion, and flanges. The upper surface portion and the lower surface portion respectively have rib or bead portions which are formed to extend away from one another and laterally across the vehicle. The flanges are formed to protrude in opposite directions from inboard ends of the upper surface portion and the lower surface portion in the vehicle, and are secured to the side bracket.

With this configuration, the upper surface portion and the lower surface portion are difficult to deform since rigidity of the upper surface portion and the lower surface portion can be enhanced or reinforced by the bead portions. In addition, since the inboard ends of the metal case are connected to the seat back frame via the side bracket, the inner side surface portion is difficult to deform. Accordingly, it is outer side surface portion of the metal case which is mainly deformed when the metal case is subjected to the expanding force of the air bag. Since the flanges are connected to the side bracket to protrude from the upper surface portion and the lower surface portion in opposite vertical directions, they tend to bend oppositely in the vertical directions (i.e., mutually stretching direction) around fitting points of the side bracket which act as fulcrums. Therefore, a lateral outward extension of the opening portion can be suppressed in contrast to the case where the flanges are bent in the mutually approaching direction. In this manner, a light weight of the metal case can be accomplished without an increase in a plate thickness of the metal case. Since the metal case has a longitudinal shape and the air bag which is being deployed is brought into firm contact with the outer side surface portion of the opening portion and rubs thereagainst, bead or rib portions which may accidently catch the air bag are not formed on the outer side surface portion.

Each of the flanges are arranged so as to merge with bead portions which extend laterally across the vehicle. In this case, each of fitting points of the flanges to the side bracket are arranged to pass through surfaces of the flanges which extend up and down respectively, from the upper and lower bead rib portions.

According to the above configuration, since longitudinal surfaces of the flanges are arranged to merge with the rib or bead portions, the flanges are resistant to bending around the fitting points of the side bracket. Therefore distortion of the opening portion in the lateral direction is further suppressed.

The flanges can, in accordance with the invention, be arranged in the vicinity of the opening portion. Accordingly, outward distortion of the opening portion can be suppressed much more since rigidity in the vicinity of the opening is enhanced.

The bead portion on the upper surface portion may be formed to have a continuous semicircular cross-sectional shape. Accordingly, the bead portions can be easily formed.

The bead portion on the lower surface portion may be tapered continuously in the inboard direction until it merges with the lower flange.

Accordingly, since the flanges are resistant to bending around the fitting points of the side bracket which act as fulcrums, an outward extension of the opening portion along the vehicle width direction can be further more suppressed. In addition, the shape of the bead portion is preferable such as to receive the weight of the air bag system.

The metal case may consist of a first case member and a second case member wherein the first case member and the second case member have respective rear surface portions which are mutually separated but overlapped at the rear of the metal case. The inflator is secured to the rear surface portion positioned on the front side of the vehicle by fitting bolts. The ends of the fitting bolts which extend toward the rear of the vehicle are covered by the rear surface portion which is a l so oriented toward the rear of the vehicle.

According to the above configuration, since the ends of the fitting bolts of the inflator are covered by the rear surface portion positioned on the rear side of the vehicle , it is not possible for a rear passenger to feel/impact against the bolts and therefore ensure that the seat as a whole remains pleasant to the touch.

One of the rear surface portions may have a convex portion that protrudes toward other of the rear surface portions. This convex portion is arranged to come into contact with other of the rear surface portions and prevent the rear surface portion coming into contact with the ends of the fitting bolts which are oriented toward the rear of the vehicle, when the rearmost of the two rear surface portions is driven toward the front of the vehicle.

In this case, the amount of projection of the convex portion from one of the rear surface portions is larger than that of the fitting bolt from the rear surface portion positioned on the front side of the vehicle.

According to the above configuration, the rear surface portion positioned on the rear side of the vehicle is brought into contact with the convex portion before it contacts the ends of the fitting bolts when manually pressed from the rear seat, and as a result the rear surface portion facing the rear of the vehicle can be prevented being deformed even further. In addition, even if a rearward reaction force is applied to the rear surface portion positioned on the front side of the vehicle upon expansion of the air bag, backward deformation of the rear surface portion positioned on the front side of the vehicle, which receives the reaction force, can be prevented since such reaction force can be transmitted to the rear surface portion positioned on the front side of the vehicle via the convex portion.

BRIEF DESCRIPTION OF THE DRAWINGS

The various features and advantages of the present invention will become more clearly appreciated as a detailed description of the embodiments of the invention is given with reference to the appended drawings in which.

DESCRIPTION OF THE PREFERRED EMBODIMENTS

A preferred embodiment of the present invention will be described with reference to FIGS. 1 to 6 hereinafter. In FIGS. 1 to 6, a symbol "II" denotes an outboard side (viz., an outer side with respect to the lateral or width direction of the vehicle) and a symbol "III" denotes an inboard side (viz., an inner side with respect to the lateral or width direction of the vehicle).

Figure 1:
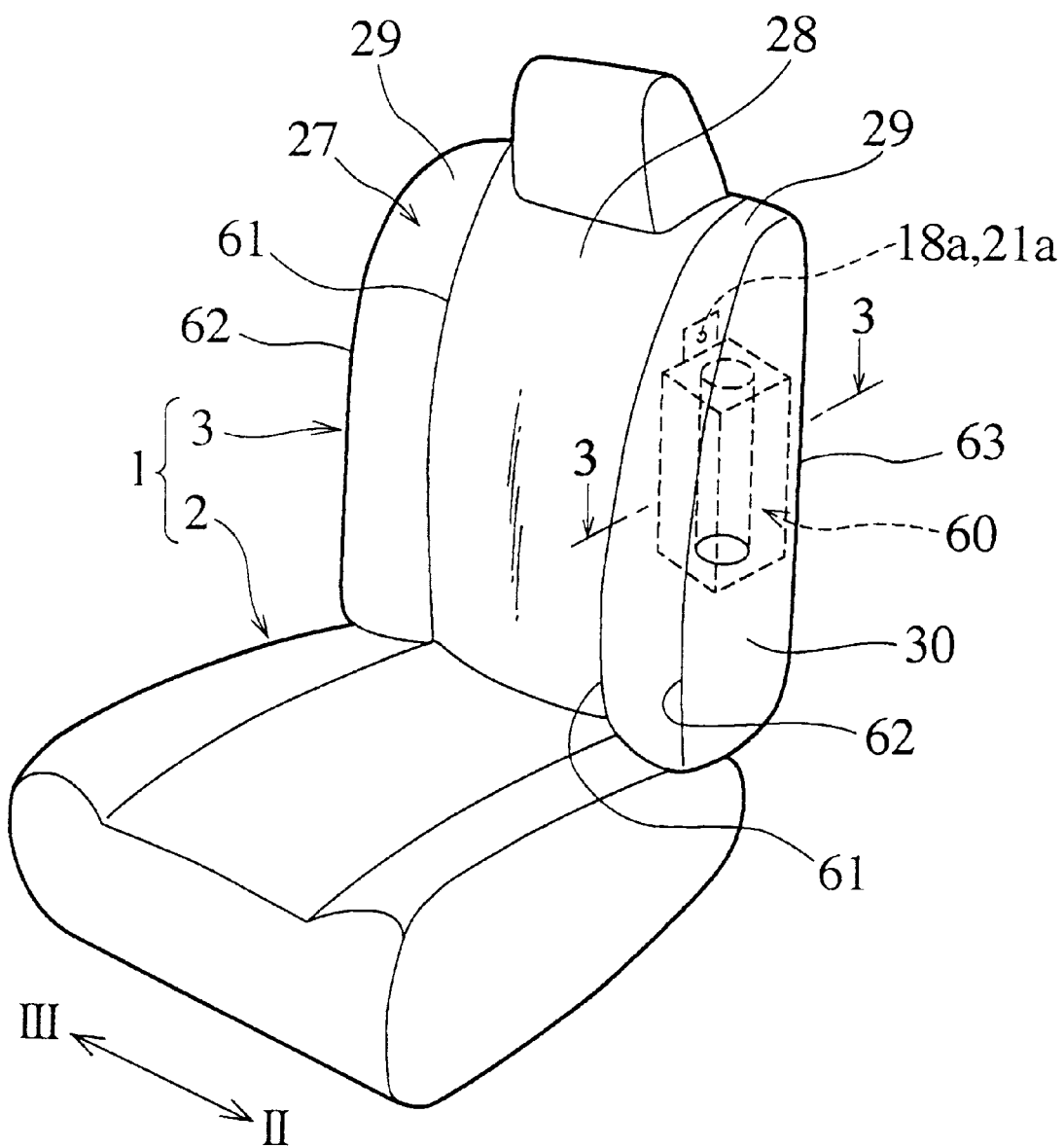
FIG. 1 is a perspective view showing a vehicle seat according to an embodiment of the present invention.
Figure 2:
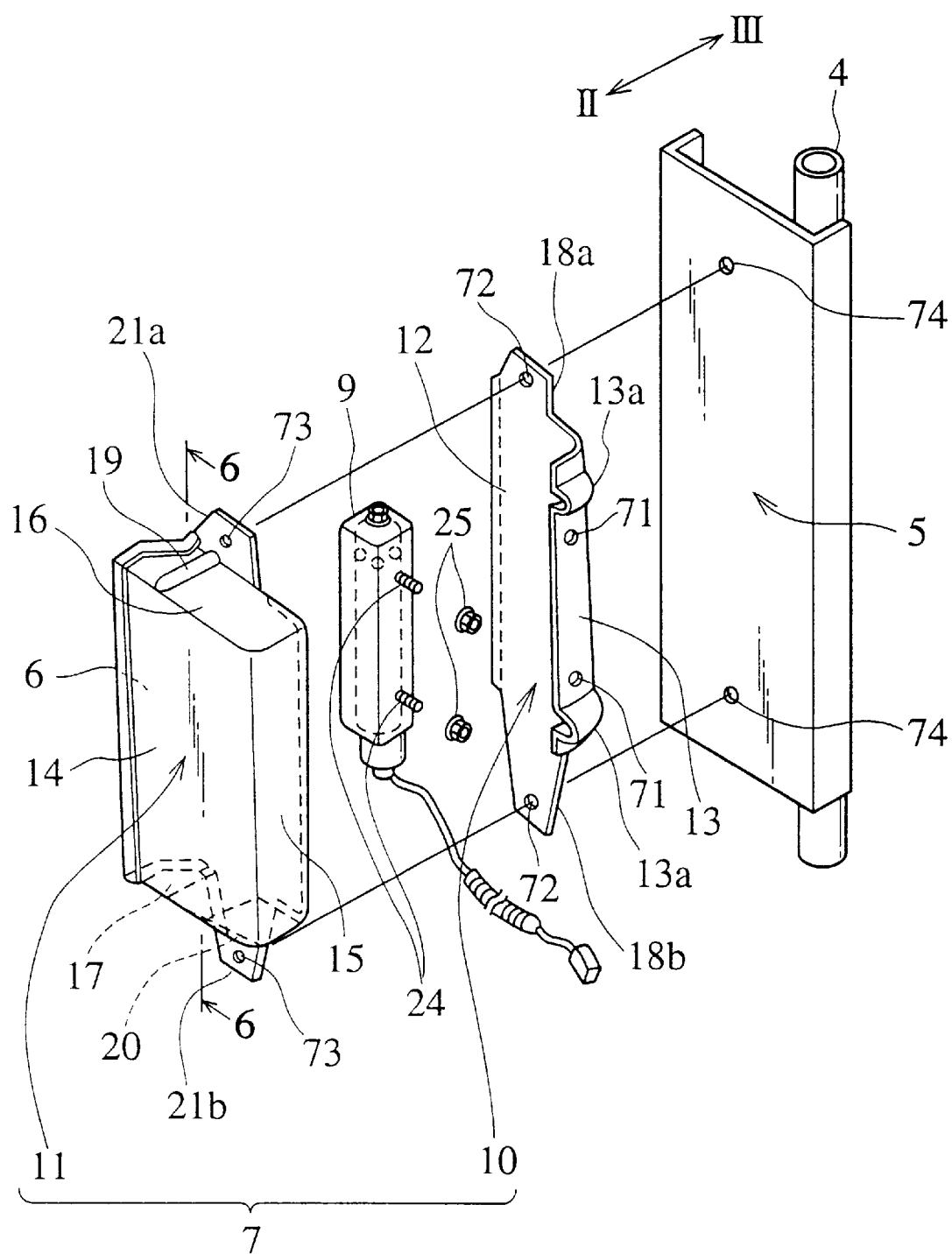
FIG. 2 is an exploded view showing an air bag module for use in the vehicle seat in FIG. 1.

FIG. 1 shows a left front seat 1. This seat 1 consists of a seat cushion portion 2 which is slidably supported on the floor panel (not shown) of the vehicle so as to be movable back/forth therealong, and a seat back portion 3 which is pivotal in the fore and aft direction (front and back) of the vehicle. An inverse U-shaped seat back frame 4, though not clearly depicted in figures, is provided in the inside of the seat back 3. A laterally extending side bracket 5 is secured to an outer portion (door side portion) of the seat back frame 4.

An air bag module 60 (air bag system) is fitted to the side bracket 5. The air bag module 60 is made up of a metal case 7 which has an opening portion 6 directed to the front side of the vehicle, an air bag 8 which is folded in a bellows-like fashion in the metal case 7, and an inflator 9 which generates a high pressure gas to inflate and expand the air bag 8.

The air bag 8 and the inflator 9 are installed together in the metal case 7. The opening portion 6 of the metal case 7 is covered with an easily breakable thin sheet (not shown).

The metal case 7 includes an inner case 10 (first case member) and an outer case 11 (second case member). The inner case 10 has an inner side surface portion 12 and a rear surface portion 13. The outer case 11 has an outer side surface portion 14, a rear surface portion 15, an upper surface portion 16, and a lower surface portion 17.

The rear surface portion 13 of the inner case 10 and the rear surface portion 15 of the outer case 11 are mutually overlapped in a manner to define a predetermined clearance 50 (see FIG. 3) and such that the rear surface portion 15 of the outer case 11 is placed behind the rear surface portion 13 of the inner case 10. As will be described later, this clearance 50 may be set so as to be longer than at least a height of a nut 25 and to sufficiently clear the ends of fitting bolts 24.

A pair of upper and lower mounting or fitting holes 71 are formed in the rear surface portion 13 of the inner case 10. Convex portions 13a are formed on the rear surface portion 13 in the upper and lower positions of respective fitting holes 71 so as to protrude rearwardly. Each of the convex portions 13a has a convex shape or a height which corresponds to the dimension of the above clearance 50. Namely, the height of the convex portion 13a is approximately identical with the length of the clearance 50. The height of the convex portion 13a is not necessarily formed to coincide with the dimension of the clearance 50. The height of the convex portion 13a may be set longer than at least a projection amount of the end of the fitting bolt 24, as described later.

On the upper and lower surfaces of the inner case 10 are formed flanges 18a, 18b which protrude oppositely along the upward and downward directions respectively. In addition, a top end of the inner side surface portion 12 constituting an edge portion of the opening portion 6 of the inner case 10 is folded back to the outside. This is because, when the air bag 8 is spreading forward, the top end of the inner side surface portion 12 of the inner case 10 can be prevented from acting as a sharp edge with respect to the air bag 8.

Similarly, a top end of the outer side surface portion 14 of the outer case 11 is folded back to the outside for the same reason. On the upper surface portion 16 and the lower surface portion 17 of the outer case 11 near the opening portion 6, bead portions 19, 20 are formed along the vehicle width direction respectively. On the upper surface portion 16 and the lower surface portion 17 of the outer case 11 are formed flanges 21a, 21b which protrude oppositely in the upward and downward directions from respective innermost side ends in the vehicle width direction. The upper bead portion 19 formed on the upper surface portion 16 has a continuous semicircular sectional shape. The lower bead portion 20 formed on the lower surface portion 17 has a tapered shape which tapers from the lower surface portion 17 toward the flange 21b (see FIG. 6). These upper and lower bead portions 19, 20 do not restrict or disturb the inner space of the metal case 7 since they are formed on the outside of the metal case 7.

The lower bead portion 20 is downwardly inclined on the inboard side and is then connected to the lower flange 21b. To this end, the lower bead portion 20 preferably receives the weight of the air bag module 60 by way of the lower flange portion 21b. Since the upper bead portion 19 has a simple semicircular shape in section, it can be readily formed by press working.

The upper and lower bead portions 19, 20 are formed on the upper surface portion 16 and the lower surface portion 17 respectively. However, no bead portion is formed on the outer side surface portion 14. This is because the metal case 7 has a longitudinal shape which has a dimension in the height direction larger than that in the vehicle width direction and therefore the air bag 8 which is deploying forward is brought into firm contact with the outer side surface portion 14 of the opening portion 6 and thus rubs therealong.

The upper and lower flanges 21a, 21b formed on the upper surface portion 16 and the lower surface portion 17 of the outer case 11 are superposed mutually with the upper and lower flanges 18a, 18b of the inner case 10 such that the upper and lower flanges 21a, 21b are come into contact with the upper and lower flanges 18a, 18b at their inner ends in the vehicle width direction. Fitting holes 72, 73 are formed in the upper and lower flanges 18a, 18b and the upper and lower flanges 21a, 21b respectively. Fitting holes 74 are formed in the side bracket 5 in registration with the fitting holes 72, 73. The outer case 11 and the inner case 10 are fixed to the side bracket 5 with bolts 22 and nuts 23 through these fitting holes 72, 73, 74. The fitting hole 73 in the upper flange 21a is arranged so as to pass through a surface which extends up from the upper bead portion 19. The fitting hole 73 in the lower flange 21b is arranged so as to pass through a surface which extends down from a lower bead portion 20. Respective bolts 22 and the nuts 23 may be secured in advance in the fitting hole 74 of the side bracket 5 by way of welding.

A pair of upper and lower fitting bolts 24 are provided on the back surface of the inflator 9 so as to protrude rearwardly. The fitting bolts 24 are passed through the fitting holes 11 formed in the rear surface portion 13 of the inner case 10 and then secured by way of nuts 25. The top ends of the fitting bolts 24 are covered by the rear surface portion 15 of the outer case 11 on the back side of the metal case 7. A padding material 26 is then provided on the seat back 3 to provide a cushion.

Figure 3:
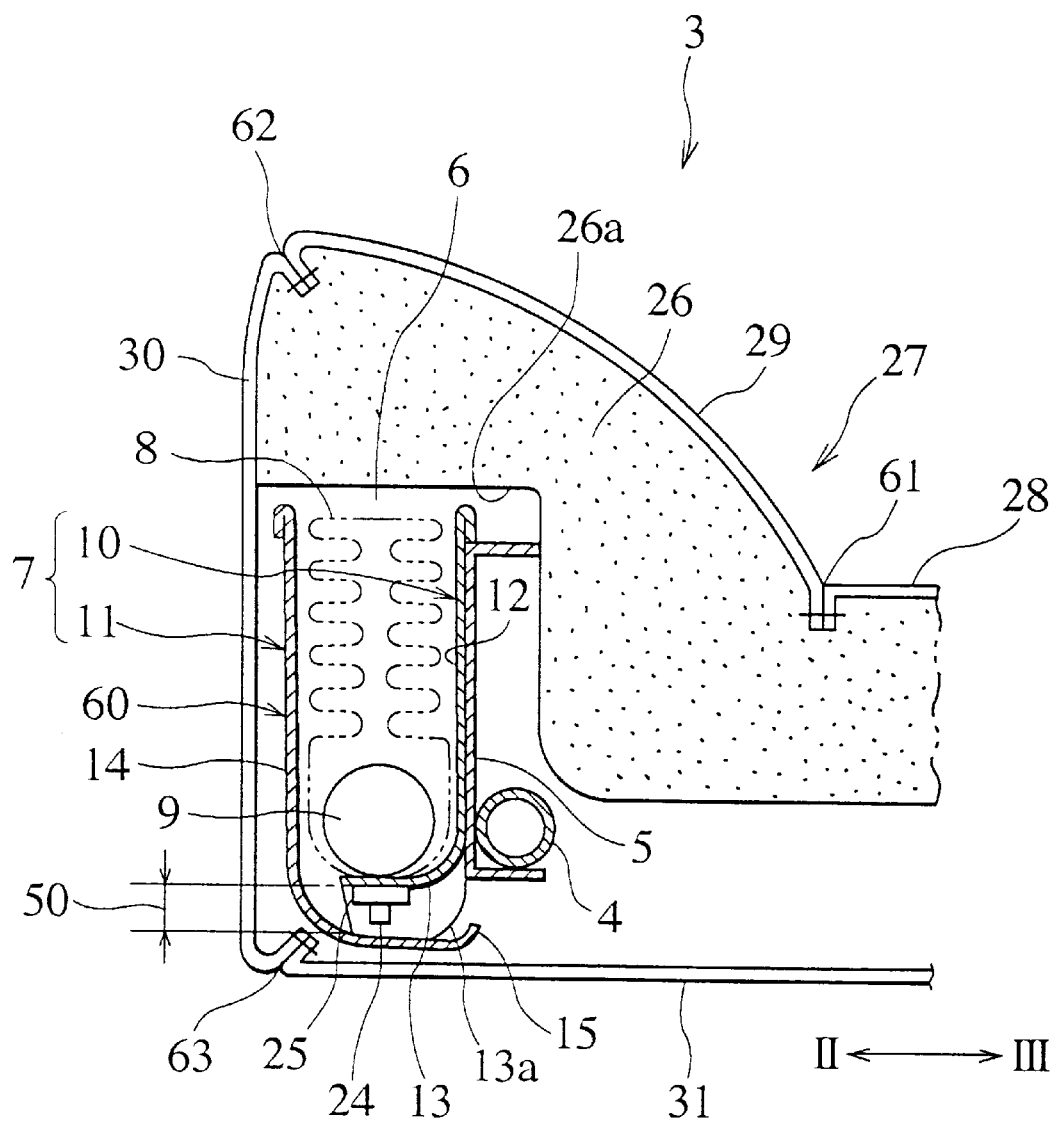
FIG. 3 is a sectional view showing the vehicle seat taken along line 3—3 in FIG. 1.
Figure 4:
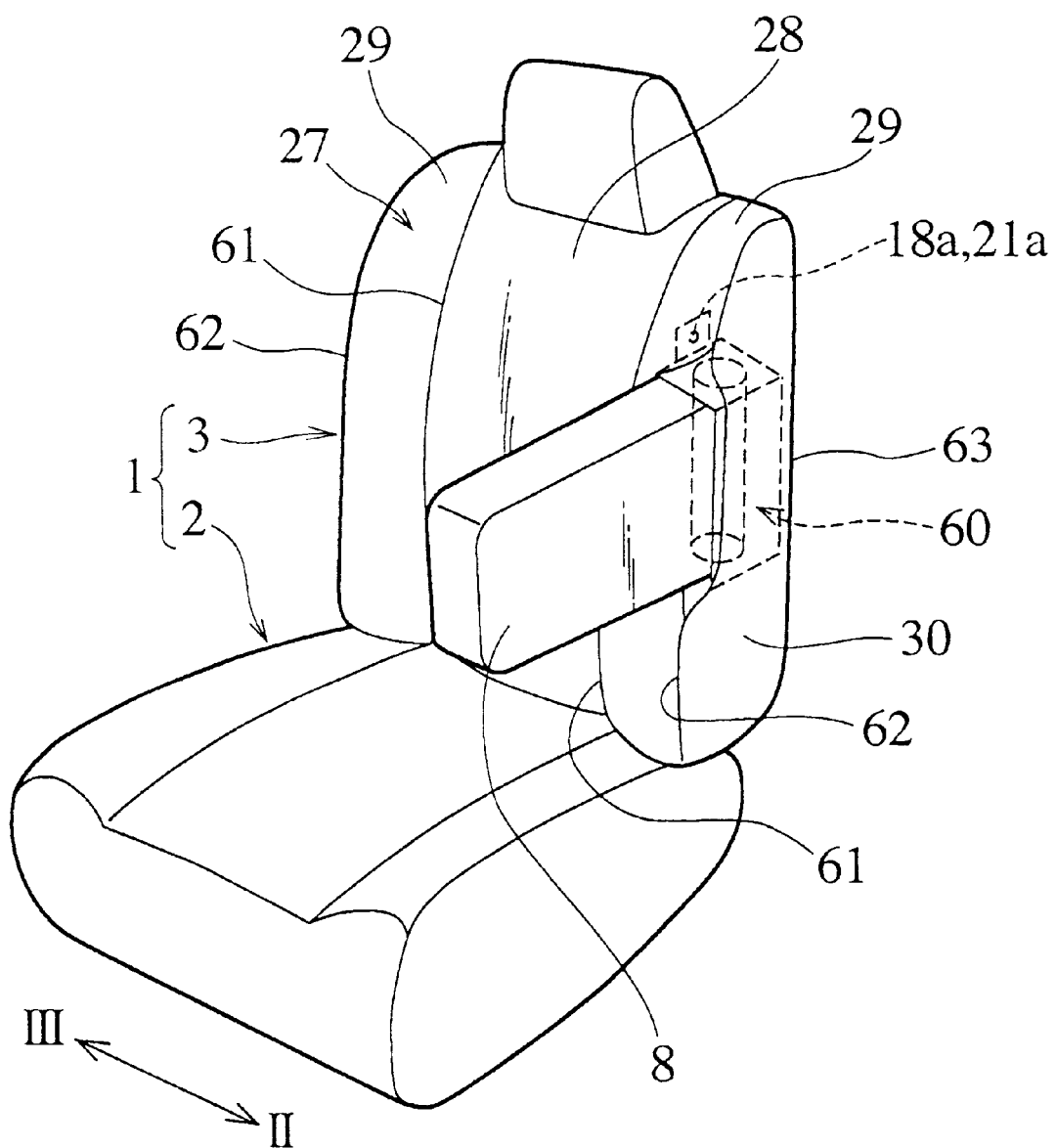
FIG. 4 is a perspective view showing the vehicle seat shown in FIG. 1 in a condition that an air bag has been spread out.

The above-mentioned air bag module 60 is secured to the seat back 3. As shown in FIG. 3, a concave portion 26a is formed on the outer side of the pad material 26 in the vehicle width direction. The seat back frame 4, the side bracket 5, and the air bag module 60 are placed in the concave portion 26a.

The overall seat back frame 4 to which the pad material 26 and the air bag module 60 are secured is covered with a cover material 27. This cover material 27 is formed by quilting wadding and cloth, but illustration of such cover material is omitted.

The cover material 27 is made up of a main portion 28 for covering a front central surface area of the seat back 3, a main side portion 29 for covering both front side surface areas of the seat back 3, a gusset portion 30 for covering side surface areas of the seat back 3, and a back portion 31 for constituting a rear surface area of the seat back 3. Mutually corresponding ends of the main portion 28, the main side portion 29, the gusset portion 30, and the back portion 31 are stitched together as stitching portions 61, 62, 63 along the vertical direction respectively.

Figure 5:
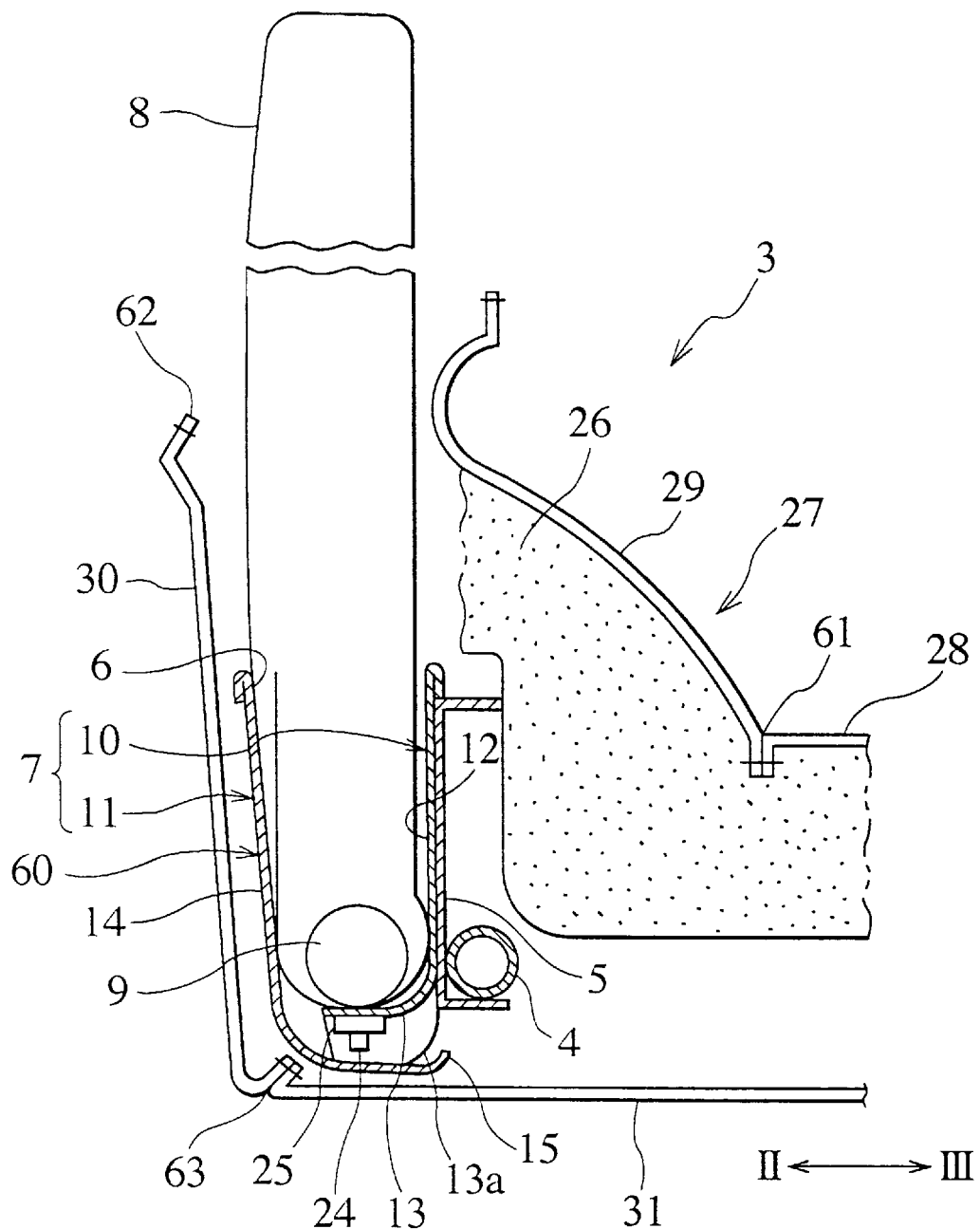
FIG. 5 is a sectional view showing the vehicle seat shown in FIG. 3 in a condition that the air bag has been spread out.
Figure 6:
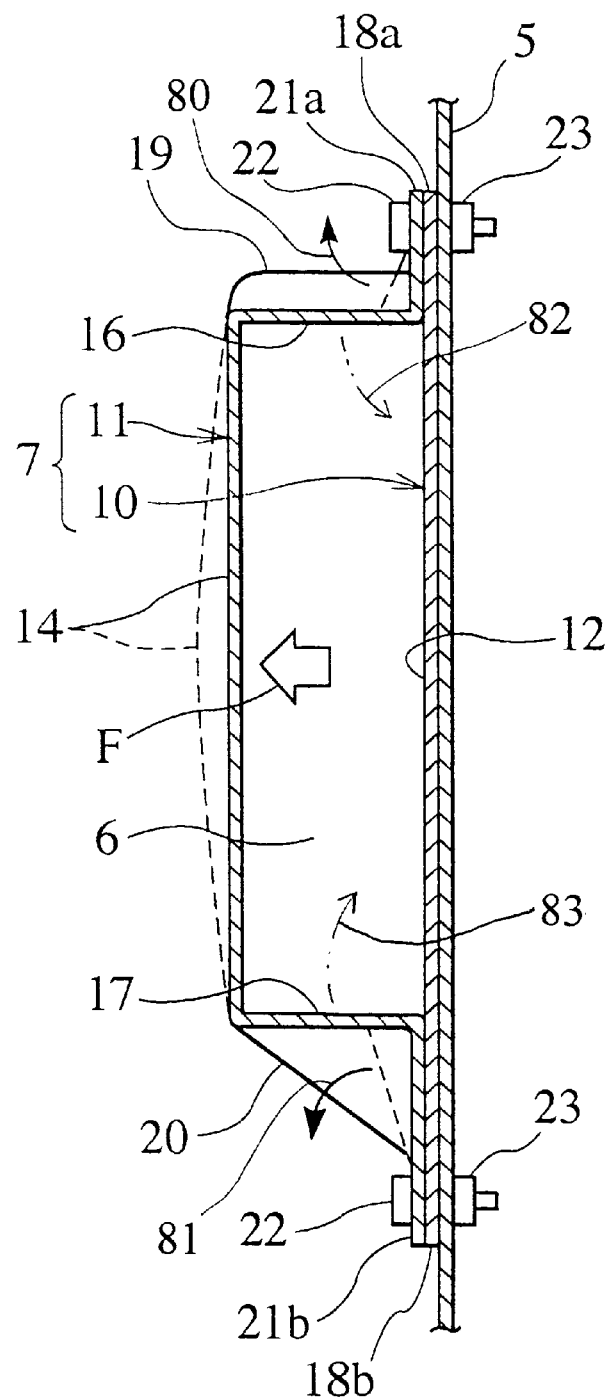
FIG. 6 is a sectional view showing a case taken along a line 6—6 in FIG. 2.

Subsequently, the operation of the air bag 8 during deployment will be explained with reference to FIG. 5. When a side collision occurs, a suitable sensor immediately detect this condition and induces a high pressure gas to issue from the inflator 9 into the air bag 8. The air bag 8 is thus inflated in the metal case 7 by the high pressure gas. Hence, the air bag 8 is caused to spread forward while extending outward toward the outer side surface portion 14 of the opening portion 6 of the metal case 7. Thus, the air bag 8 can break through the pad material 26 positioned in front of the air bag module 60 (see FIG. 5). In this embodiment, the air bag 8 can further break through the stitching portion 62 between the main side portion 29 and the gusset portion 30 to then spread out forwardly into the compartment.

A strong force F is applied to the outer side surface portion 14 of the opening portion 6 when the air bag 8 is inflated in the metal case 7, nevertheless, the outer side surface portion 14 is not excessively deformed laterally outward. That is to say, since rigidity of the upper surface portion 16 and the lower surface portion 17 is enhanced or reinforced by the bead portions 19, 20, only the outer side surface portion 14 of the opening portion 6 is deformed. In addition, the flanges 18a, 18b, 21a, 21b formed to project oppositely in the upward and downward directions are fitted to the side bracket 5 and therefore the flanges 18a, 18b, 21a, 21b and the upper and lower surface portions 16, 17 tend to be bent opposite vertical directions 80, 81 (i.e., mutual stretching direction) around fitting points of the bolts 22 and the nuts 23 as fulcrums. Therefore, an outward extension of the outer side surface portion 14 of the outer case 11 can be suppressed compared to the case where the upper and lower surface portions 16, 17 are bent in the mutually approaching direction 82, 83.

Moreover, since longitudinal locations (i.e., back and forth locations) of the flanges 18a, 18b, 21a, 21b are set to coincide with those of the bead portions 19, 20, the flanges 18a, 18b, 21a, 21b are not readily bent around the fitting points (acting as the fulcrums) and therefore the lateral extension of the opening portion 6 can be greatly suppressed. Also the shape of the lower bead portion 20 makes it hard to bend the lower flange 21b.

In addition, because the flanges 18a, 18b, 21a, 21b are provided in the vicinity of the opening portion 6, the rigidity of the opening portion 6 is improved. Accordingly, the lateral extension of the opening portion 6 in the vehicle is further suppressed.

According to this embodiment, in a normal state where the air bag 8 is not deployed, the ends of the fitting bolts 24 which protrude backward from the rear surface portion 13 of the inner case 10 are covered with the rear surface portion 15 of the outer case 11. For this reason, even if a rear seat passenger pushes against the seat back 3 above the rear portion of the air bag module 60, he or she is protected from contact with the connection bolts and is not effected by and/or aware of the presence of the module.

Since the convex portions 13a each having the projection height equivalent to the clearance 50 are formed on the rear surface portion 13 of the inner case 10, the rear surface portion 15 of the outer case 11 is not deformed in the forward direction even when force is manually applied by a passenger behind the seat. At the same time, a rearward reaction force is applied from the inflator 9 to the rear surface portion 13 of the inner case 10 at the time of expansion of the air bag 8. However, since such reaction force can also be transmitted to the rear surface portion 15 of the outer case 11 via the convex portions 13a, the rear surface portion 13 of the inner case 10 is in no means deformed rearwardly.

It should be noted that while the backward convex portions 13a have been formed on the rear surface portion 13 of the inner case 10 in the above description, the forward convex portions may be alternatively formed on the rear surface portion 15 of the outer case 11.

What is claimed is:

1. An air bag system for a vehicle seat comprising:
   a metal case fitted to a side bracket of a seat back frame, said metal case having a longitudinal shape in which a dimension in a height direction of a vehicle is larger than a dimension in a vehicle width direction, said metal case having an opening directed toward a front of a vehicle, and an upper surface portion and a lower surface portion;
   an inflator arranged in said metal case; and
   an air bag installed in said metal case, said air bag being arranged to spread out from said opening toward the front of the vehicle when gas generated by said inflator is injected thereinto;
   first and second bead portions which respectively extend laterally along said upper surface portion and the lower surface portion in the vehicle width direction at positions spaced from the opening of said metal case; and
   first and second flanges, said first and second flanges extending normally to said first and second bead portions and in mutually opposite directions from an inboard end of said upper surface portion and an inboard end of said lower surface portion, said first and second flanges being connected to the side bracket.

2. An air bag system for a vehicle seat comprising:
   a metal case fitted to a side bracket of a seat back frame, said metal case having a longitudinal shape in which a dimension in a height direction of a vehicle is larger than a dimension in a vehicle width direction, said metal case having an opening directed toward a front of a vehicle;
   an inflator arranged in said metal case; and
   an air bag installed in said metal case, said air bag being arranged to spread out from said opening toward the front of the vehicle when gas generated by said inflator is injected thereinto;
   wherein said metal case includes an upper surface portion and a lower surface portion, the upper surface portion and the lower surface portion respectively having first and second bead portions which extend laterally along said upper and lower surfaces in the vehicle width direction, and
   first and second flanges, said first and second flanges extending in mutually opposite directions from an inboard end of said upper surface portion and an inboard end of said lower surface portion, said first and second flanges being connected to said side bracket, wherein each of said first and second flanges is respectively arranged to be rigidly connected with an end of said first and second bead portions.

3. An air bag system for a vehicle seat according to claim 2, wherein first and second fitting points of said first and second flanges at which said first and second flanges are connected to the side bracket are respectively arranged so as to to be vertically displaced from a position where the first and second bead portions merge with said first and second flanges.

4. An air bag system for a vehicle seat according to claim 2, wherein said flanges are arranged near said opening.

5. An air bag system for a vehicle seat according to claim 2, wherein the first bead portion is formed on said upper surface portion and has an arcuate cross-sectional shape.

6. An air bag system for a vehicle seat comprising:
   a metal case fitted to a side bracket of a seat back frame, said metal case having a longitudinal shape in which a dimension in a height direction of a vehicle is larger than a dimension in a vehicle width direction, said metal case having an opening directed toward a front of a vehicle;
   an inflator arranged in said metal case; and
   an air bag installed in said metal case, said air bag being arranged to spread out from said opening toward the front of the vehicle when gas generated by said inflator is injected thereinto;
   wherein said metal case includes an upper surface portion and lower surface portion, the upper surface portion and the lower surface portion respectively having first and second bead portions which extend laterally along said upper and lower surfaces in the vehicle width direction, and
   first and second flanges, said first and second flanges extending in mutually opposite directions from an inboard end of said upper surface portion and an inboard end of said lower surface portion, said first and second flanges being connected to said side bracket, wherein the second bead portion is formed on said lower surface portion and continuously tapers until it reaches the second flange.

7. An air bag system for a vehicle seat comprising:
   a metal case fitted to a side bracket of a seat back frame, said metal case having a longitudinal shape in which a dimension in a height direction of a vehicle is larger than a dimension in a vehicle width direction, said metal case having an opening directed toward a front of a vehicle;
   an inflator arranged in said metal case; and
   an air bag installed in said metal case, said air bag being arranged to spread out from said opening toward the front of the vehicle when gas generated by said inflator is injected thereinto;
   wherein said metal case includes an upper surface portion and a lower surface portion, the upper surface portion and the lower surface portion respectively having first and second bead portions which extend laterally along said upper and lower surfaces in the vehicle width direction, and
   first and second flanges, said first and second flanges extending in mutually opposite directions from an inboard end of said upper surface portion and an inboard end of said lower surface portion, said first and second flanges being connected to said side bracket, wherein:
said metal case consists of a first case member and a second case member, said first case member and said second case member have respective first and second rear surface portions which are mutually separated and which are overlapped on a back side of said metal case, the second rear surface portion being positioned rearwardly of the first rear portion, said inflator is secured to the first rear surface portion by a fitting bolt, and an end of said fitting bolt which projects rearwardly from the first rear surface portion is covered the second rear surface portion.

8. An air bag system for a vehicle seat according to claim 7, wherein:

the first rear surface portion has a convex portion which protrudes toward the second rear surface portion, and said convex portion comes into contact with the second rear surface portion so as to prevent the second rear surface portion from coming into contact with the end of said fitting bolt when the second rear surface portion is shifted toward a front of said vehicle.

9. An air bag system for a vehicle seat according to claim 8, wherein a projection amount of said convex portion from said first rear surface portion is larger than a projection height of the fitting bolt beyond the first rear surface portion.

10. An air bag system for a vehicle seat according to claim 7, wherein:

the second rear surface portion has a convex portion which protrudes toward the first rear surface portion, and wherein the convex portion comes into contact with the first rear surface portion so as to prevent the second rear surface portion from coming into contact with the end of said fitting bolt when the second rear surface portion is shifted toward the front the vehicle.

11. An air bag system for a vehicle seat according to claim 10, wherein a projection amount of the convex portion from the second rear surface portion is larger than a projection height of the fitting bolt beyond the first rear surface portion.

* * * * *